United States Patent [19]

Zawitz

[11] Patent Number: 5,110,315
[45] Date of Patent: May 5, 1992

[54] ANNULAR SUPPORT DEVICE WITH PIVOTAL SEGMENTS

[76] Inventor: Richard Zawitz, 365 Moncada Way, San Francisco, Calif. 94127

[21] Appl. No.: 678,717

[22] Filed: Apr. 1, 1991

[51] Int. Cl.$^5$ .......................................... A63H 33/12
[52] U.S. Cl. ................... 446/102; 446/121; 446/487
[58] Field of Search ............... 248/176, 200, 205.1, 248/274, 302, 309.1, 682, 441.1, 121, 127, 224.4, 223.4; 446/102, 486, 487, 489; 403/361; 24/453, 297, 590

[56] References Cited

U.S. PATENT DOCUMENTS

| | | | |
|---|---|---|---|
| 3,238,586 | 3/1966 | Stoffel | 24/453 |
| 3,251,103 | 5/1966 | Saut | 24/297 |
| 3,900,984 | 8/1975 | Garelick | 446/487 X |
| 4,232,473 | 11/1980 | Jenkins | 446/102 |
| 4,305,582 | 12/1981 | Barton | 446/486 |
| 4,377,916 | 3/1983 | Komiya | 446/487 |
| 4,509,929 | 4/1985 | Zawitz | 446/102 |
| 4,778,184 | 10/1988 | Fleischer | 446/487 X |
| 4,935,995 | 6/1990 | Daus, Jr. | 24/453 |
| 5,018,252 | 5/1991 | Butler | 24/453 |

*Primary Examiner*—Ramon O. Ramirez
*Attorney, Agent, or Firm*—Fleit, Jacobson, Cohn, Price, Holman & Stern

[57] ABSTRACT

An annular support device is formed by a series of identical torus segments with adjacent segments connected end-to-end in a continuous loop. One end face of each segment has a central channel for receiving the extension of the adjacent torus segment. The extension-channel interface between adjacent segments defines a twisting axis permitting each segment to be twisted through 360 degrees relative to the other segments. The support device may be twisted into an infinite variety of decorative and useful configurations. Each end face has a raised peripheral rim which abuts with an identical cooperating peripheral rim on the opposed face of the adjacent segment. The rims are circular and define a common interface plane perpendicular to the twist axis therebetween. The torus curve causes the twist axis at each end of a segment to be non-aligned, and prevents individual segments from being twisted relative to both adjacent segments simultaneously. The non-alignment locks each segment in place, and can be displaced only as part of a larger group of segments. The random orientations of the twisting axis tend to oppose displacement of the segments causing the annular device to retain the present configuration. The twist axis through each extension-channel interface passes through the center of the opposed circular rims. The torus surface of each segment is flush and continuous with the torus surface of the adjacent segments.

11 Claims, 8 Drawing Sheets

ANNULAR SUPPORT DEVICE WITH PIVOTAL SEGMENTS

Field of the Invention

This invention relates to an annular device formed by a plurality of pivotally connected segments, and more particularly to such an annular device which may be twisted into an infinite variety of useful and decorative structures.

BACKGROUND OF THE INVENTION

U.S. Pat. No. 4,232,473 to Jenkins teaches a novelty toy device for forming geometric configurations. The segments of Jenkins are right angle elbows with straight legs without a continuous center line of symmetry. The collective visual effect of Jenkins lacks grace. The Jenkins twisting axis tend to align along the three major geometric axis (X, Y and Z), reducing the configuration retention ability of the overall device. Jenkins has a center leg for creating two closed loops, which severely limits the flexibility and scope of configurations.

U.S. Pat. No. 4,509,929 is my earlier patent disclosing an annular support device with a particular type of connector.

SUMMARY OF THE INVENTION

It is therefore an object of this invention to provide an annular device with improved pivotally connected segments which may be twisted into many useful configurations.

It is a further object of this invention to provide such an annular device which tends to retain the configuration set by the user.

It is another object of this invention to provide such an annular device which may be fixed in the configuration set by the user.

It is another object of this invention to provide such an annular device which may be twisted into an infinite number of graceful, decorative configurations.

It is another object of this invention to provide such an annular device which functions as a diversion tranquilizer by occupying the user's hands and attention.

It is another object of this invention to provide such an annular device which may be employed as a toy or puzzle.

Briefly, these and other objects of the present invention are accomplished by providing a plurality of serially connected rigid segments forming a continuous annular device which may be twisted into an infinite number of configurations. The ends of each segment are pivotally secured to the adjacent segments for permitting the twisting. Each configuration has a continuous center line therearound. The end faces on each segment are circular and normal to the center line defining an interface plane between each pair of adjacent segments. The pivot axis between adjacent segments is normal to the interface plane. Engagement means on adjacent segments secure the segments together.

BRIEF DESCRIPTION OF THE DRAWINGS

Further objects and advantages of the decorative, support device, and the operation of the pivotally connected segments will become apparent from the following detailed description and drawings in which.

DETAILED DESCRIPTION OF THE PREFERRED EMBODIMENTS

Figure 1:
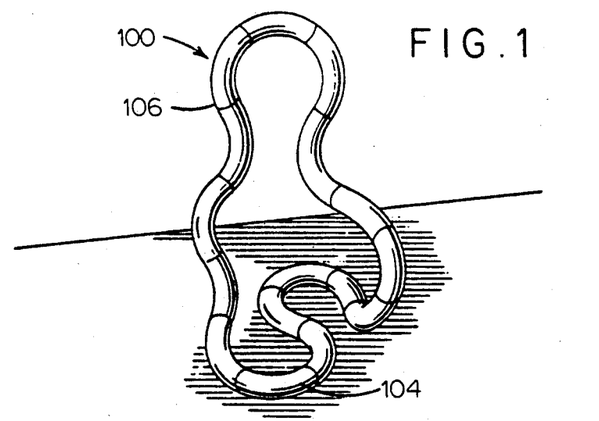
FIG. 1 is a perspective view of an annular device having torus segments in a random decorative configuration.
Figure 2:
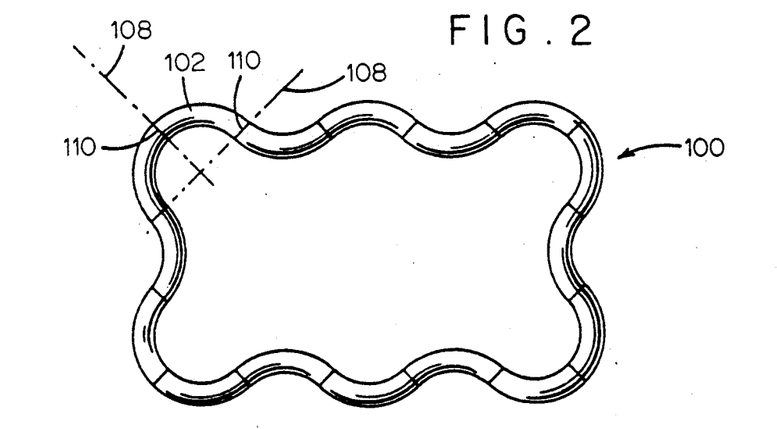
FIG. 2 is a plan view of the annular device of FIG. 1 in a flat configuration showing the torus segments and the twisting axis at the interface between segments.

Annular device 100 is formed by a plurality of pivotally connected segments 102, which may be twisted into an infinite variety of configurations such as the unique and decorative sculpture shown in FIG. 1. Coplanar base portion 104 rests on the display surface, and supports smoothly curving upper portion 106. The sculpture in the FIG. 1 and 2 embodiments have sixteen segments which can be seen in the flat configuration shown in FIG. 2. Every segment 102 has a twisting axis 108 at each end thereof which pass through an end interface 110 between each pair of adjacent segments. Each segment may be twisted relative to either adjacent segment through 360 degrees by displacing or flipping the remainder of annular device 100.

Figure 3:
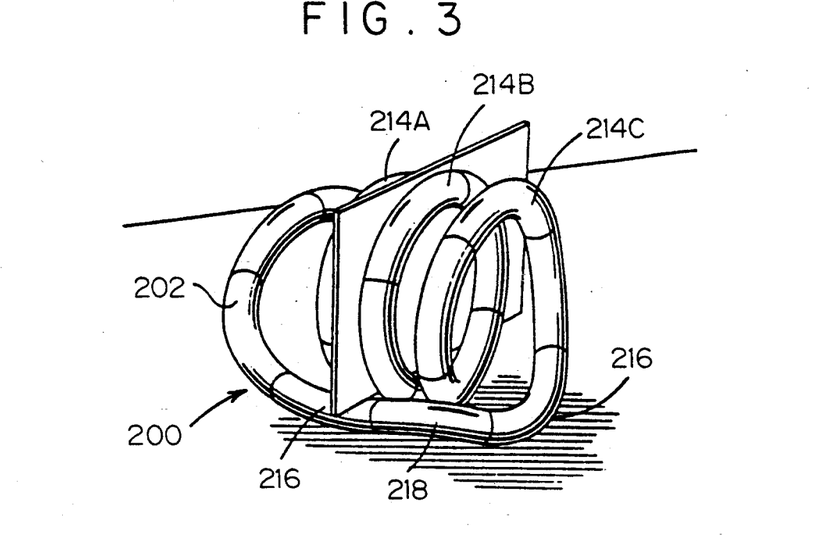
FIG. 3 is a perspective view of an annular device in a vertical coiled embodiment which is useful as a desk organizer.

Utilitarian embodiments, such as helical desk organizer 200 shown in FIG. 3 may also be obtained by twisting segments 202. Adjacent helical loops 214A, 214B and 214C form separation dividers for containing small, frequently used items, such as letters and file cards. Each loop 214 is supported at a bottom point by the supporting surface (desk top). Stabilizer portion 218 extends from the ends of the helix to engage the support surface at remote points 216 for preventing the helix from rolling. The helix may be expanded axially to increase the separation between dividers 214 to accommodate thicker items.

The file holder embodiment 200 of FIG. 3 is formed by eighteen identical torus segments 202 connected end-to-end to form a continuous annular device. Each segment 202 is a 90 degree section of a torus (shown in FIG. 4), having a curved body portion 20, with recessed face 222E at one end and recessed face 222C at the other end.

Center line of symmetry 226 of curved body portion 220 is a 90 degree arc defining the plane of the torus segment. Center line 226 has end points 228E and 228C. Each end face 222 defines an interface plane containing end points 228, and which is perpendicular to center line 226 at end points 228, and perpendicular to the plane of the torus segment. The interface planes are also perpendicular to each other in the 90 degree embodiment of FIG. 4.

Figure 4:
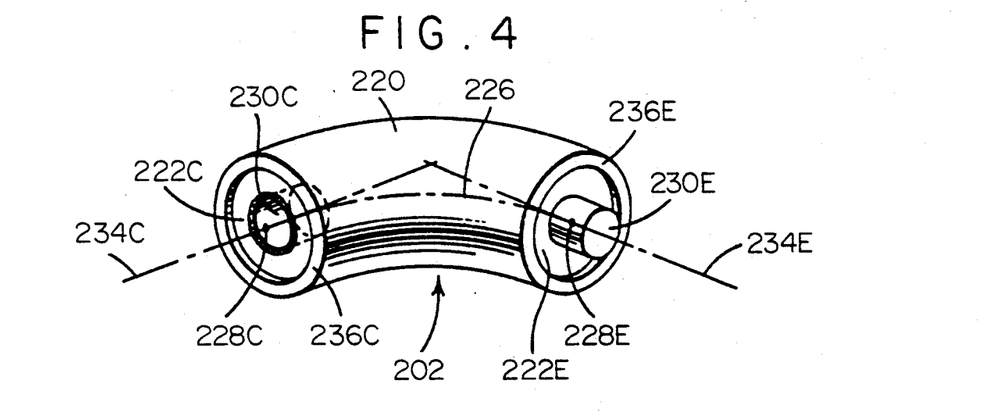
FIG. 4 is a perspective schematic view of a 90 degree torus segment used to form the embodiments of FIGS. 1, 2 and 3.

End face 222E of each segment has a schematically shown central extension 230E, with a straight central axis 234E extending perpendicular to the interface plane. Axis 234E is tangent to curved center line 22 at end point 228E thereof. End face 222C of each segment has a cooperating cylindrical central channel 230C with a central axis 234C extending perpendicular to the interface plane. Axis 234C is tangent to curved center line 226 at one end point 228C thereof.

The central channel of each torus segment in annular device 200 has an inwardly tapering rib at its terminal portion located distally from end face 222C so as to receive the central extension-channel interface which locks a distal bulb portion of the central extension beyond the terminal portion of the central channel. Center axis 234E and 234C of each interface coincide defining a common pivoting or twisting axis. Chain 200 may be twisted into an infinite number of random configurations, each of which has a continuous closed center line of symmetry formed by center line 226 through each segment. End points 228 of adjacent center lines remain coincident regardless of the complexity of the configuration of the annular device.

End faces 222 have raised peripheral rims 236E and 236C which abut with an identical cooperating peripheral rim on the adjacent segment. Rims 236 are circular and define the common interface plane therebetween.

Configuration Retention

The annular device has an amazing retention property, which causes the segments thereof to remain in the last configuration set by the user The annular device is readily twistable into new configurations, but tends to retain the prior configuration until retwisted. Preferably, each extension fits snugly into the cooperating channel of the adjacent segment, which aids the retention property. In addition, some configurations have points of contact between segments that touch (and with the support surface). These contact points permit mutual leaning and support, which also aids configuration retention.

Another source of retention is due to the subtle relationship between the interface twisting axes The twisting axes are randamly oriented. The probability of two axes being perfectly aligned or coincident in a given configuration is highly remote. Such alignments, when they do occur, offer less resistance to pivoting because they involve the snug-static friction of only the aligned interfaces. In the usual non-aligned case more interfaces are involved, and entire sections of the annular device must be simultaneously twisted and shifted as a unit in order to move a single segment.

The torus curve along each segment body portion causes the two twisting axes of each segment to be non-aligned (at 90 degrees in the FIG. 4 embodiment). A single segment cannot be twisted relative to both adjacent segments at the same time without displacing other segments within the annular device. The segments cannot be displaced independently.

Even in the unusual case of axis alignment, the segments between the aligned interfaces ca pivot or be displaced only as part of the group of adjacent segments bounded by the pair of aligned axes. These locked groups may be large (the entire annular device) or small (four minimum) depending on the configuration. Each locked group must have at least four torus quadrant segments in order to present an accumulated axis shift of 360 degrees required for axis alignment.

Typically when the user initially twists the annular device, the twisting axes are random and non-aligned. The initial locked group includes the entire chain of segments. The force required to displace a single segment must be sufficient to disturb the entire annular device, simultaneously moving every segment and reorienting every twisting axis. The chain-wide disturbance proceeds until two axes come into alignment. The initial resistance to change in the annular device is the origin of the configuration retention characteristic. This initial resistance is at least, in part, responsible for the self-supporting feature of sculpture 100 shown in FIG. 1. Minor displacement forces (such as gravity and occasional bumps) acting on the annular device are insufficient to overcome the non-alignment resistance.

Manual Diversion Tranquilizer

Hand action coupled with a low attention requirement is well known to have a tranquilizing effect. Crocheting and whittling are traditional examples of diversion-relaxation therapy. The present annular device provides a similar tension relief function. Twisting the device is a simple, thoughtless procedure, which instantly produces unlimited fascinating and unpredictable configurations. With each twist of the segments, the device undergoes a chain-wide transformation in silhouette and axis orientation without repetition. The device functions as a mechanical or sculptural kaleidoscope, with a corresponding relaxing, mesmeric characteristic.

The continuous center line symmetry around the annular device insures that each of the infinite random configurations will have a smooth and graceful silhouette which contributes to the relaxation of the user. The torus section embodiments produces only continuous configurations free from geometric or mathematical discontinuities (no infinite derivatives).

The annular device may be displayed as a stationary artistic sculpture without change, and still have a desirable therapeutic effect. The flowing appearance of the annular device contributes to a relaxing atmosphere.

Varying Chain Lengths and Segment Shapes

Figure 5A:
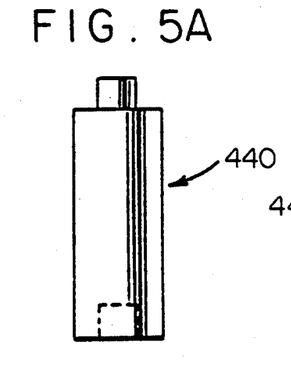
FIG. 5A is a straight segment.
Figure 5B:
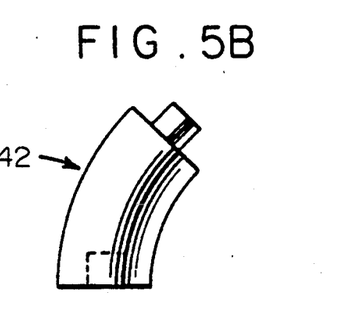
FIG. 5B is a shorter 45 degree torus segment.
Figure 6:
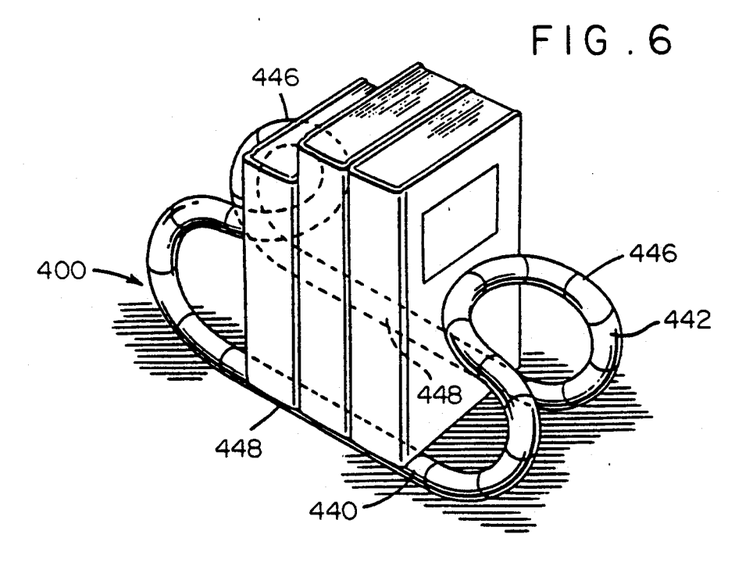
FIG. 6 is a perspective view of an elongated book rack formed by the straight segments of FIG. 5A and the short curved segments of FIG. 5B.

Any number of segments may be included in the annular device, to provide a wide range of configurations. Straight segments 440 (shown in FIG. 5A) and shorter curved segments 442 (shown in FIG. 5B) may also be employed in an annular device to modify the scope of possible configurations. FIG. 6 shows book rack 400 formed by twenty-four 45 degree torus segments 442, and eight straight segments 440. The curved segments form opposed, elevated end supports 446. The straight segments form a pair of connecting rails 448 between the end rests. The introduction of adjacent straight segments reduces the scope of possible configurations because the straight portion has only one twisting axis common to each segment therein. The shorter curved segments increases the scope of possible configurations because of the higher number of twisting axes per unit length. However, the shorter torus segments tend to reduce the retention property of the annular device because of the smaller step in axis orientation.

Interface Structure

Figure 7:
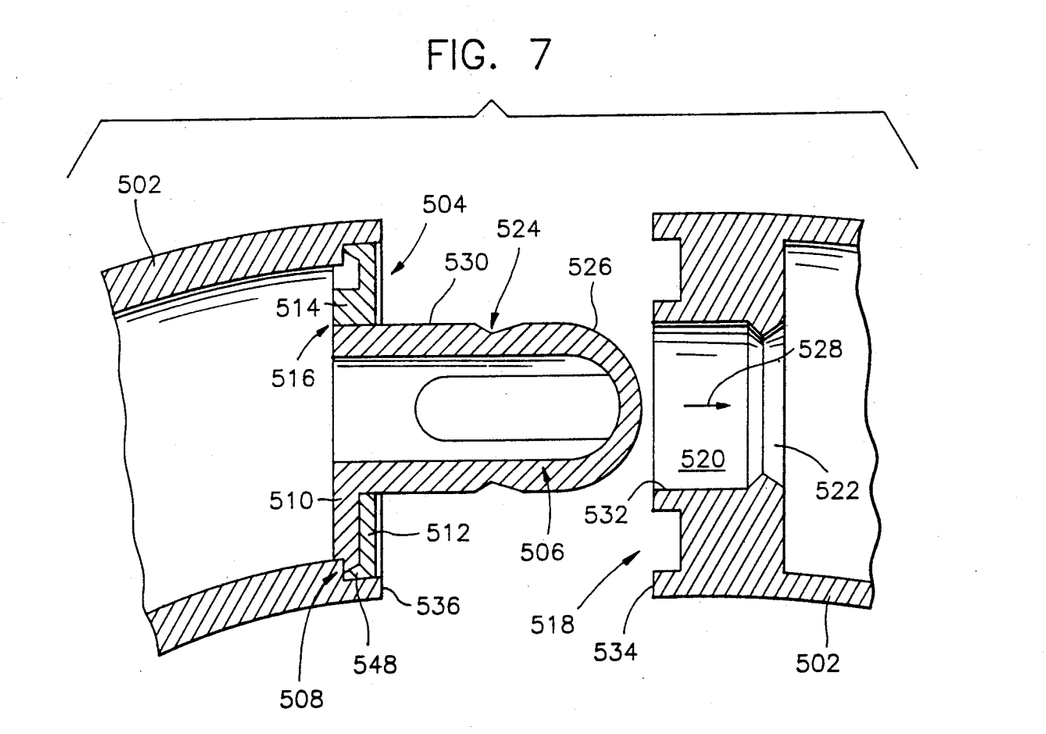
FIG. 7 is an exploded sectional view of an annular segment with a central extension mounted at one end and an adjacent annular segment with a central channel.

In FIG. 7, annular segment 502 includes, at one end 504, a central extension member 506. The member 506 is seated in end 504 of segment 502 to engage a stepped recess 508. Stepped ridge 538 of base plate 512 is shaped complementary to the recessed step 508 of segment 502.

Mounted on top of a flat plate portion 510 of the member 506 is a securing ring washer 512, having projection 514 fitted within an opening 516 of plate 510. The securing ring washer 512 is glued or secured within the stepped portion 508 and simultaneously secured to the flat plate portion 510 so as to secure the member 506 projecting from end 504 of segment 502.

Figure 13:
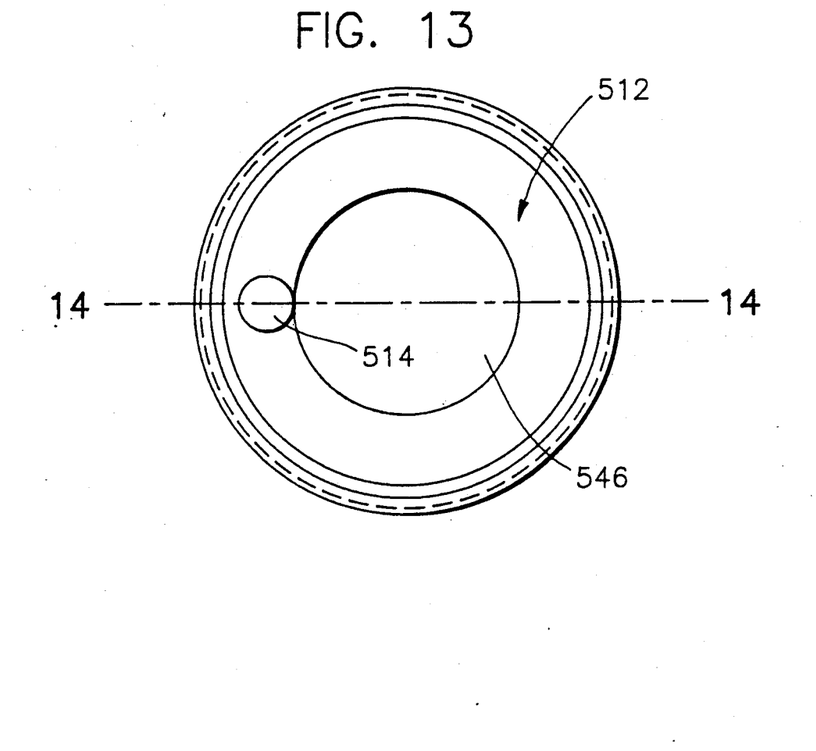
FIG. 13 is a top plan view of a securing washer.
Figure 14:
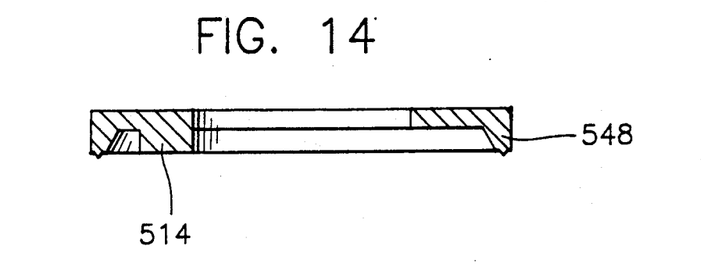
FIG. 14 is a cross-sectional view taken along line 14—14 of FIG. 13.
Figure 15:
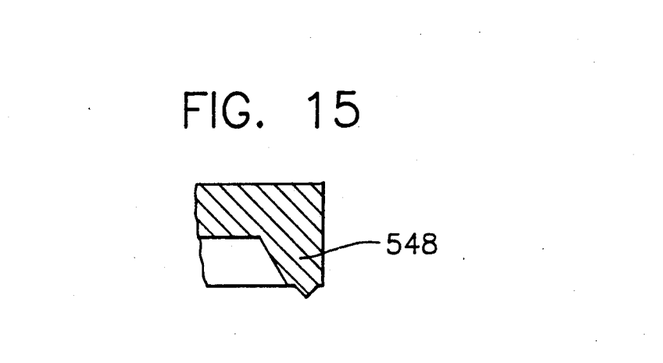
FIG. 15 is an enlarged view of detail A of FIG. 14.

Shown in FIG. 7, is a similarly configured segment 502, showing opposite end 518. End 518 includes a central cylindrical channel 520 for receipt of member 506. The channel 520 includes radially inwardly projecting rib 522, which is shaped complementary to recess 524 defined on member 506. Rib 522 forces bulbous terminal portion 526 of member 506 to be compressed as the portion 526 is passed through channel 520 in the direction of arrow 528. Portion 526 is compressed until after passing beyond rib 522 at which point, due to the natural bias of the portion 526, its original configuration is resumed with rib 522 engaging in recess 524 with cylindrical section 530 of member 506 rotatably mounted in cylindrical section 532 of channel 520. In this position, circumferential rim 534 of end 518 engages circumferential rim 536 of end 504. Twisting of adjacent segments is thereby smoothly facilitated. The details of central extension member 506 are shown in FIGS. 8 through 12 and the details of securing ring washer 512 are shown in FIGS. 13 through 15.

Figure 8:
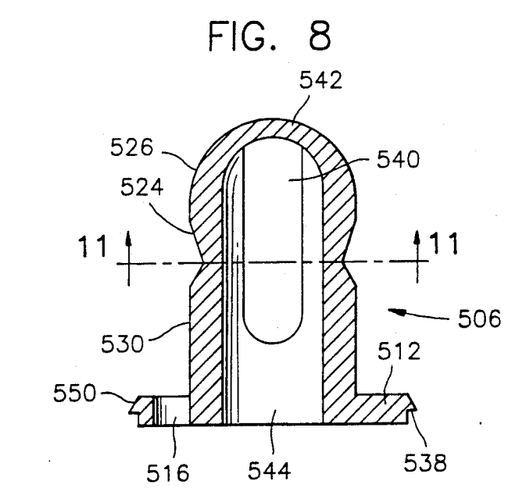
FIG. 8 is a sectional view of the central extension member shown in FIG. 7.
Figure 9:
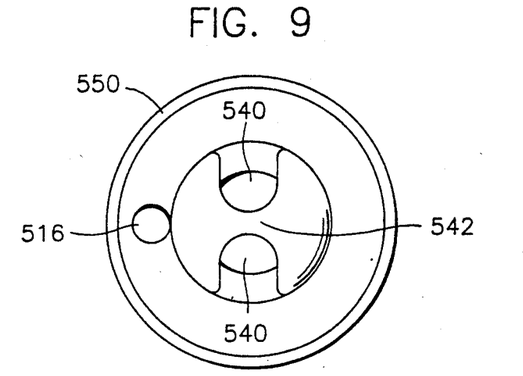
FIG. 9 is a top plan view of FIG. 8.
Figure 10:
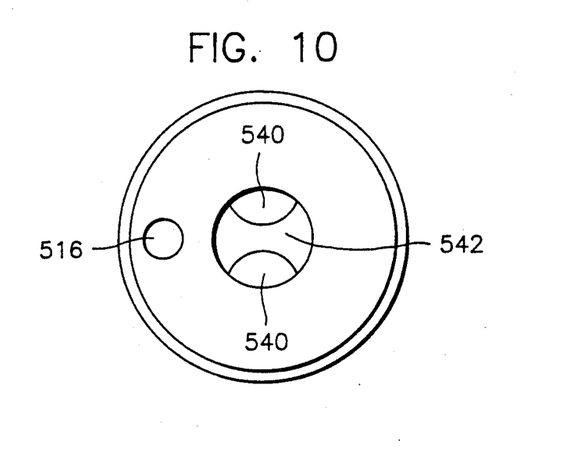
FIG. 10 is a bottom view of FIG. 8.
Figure 11:
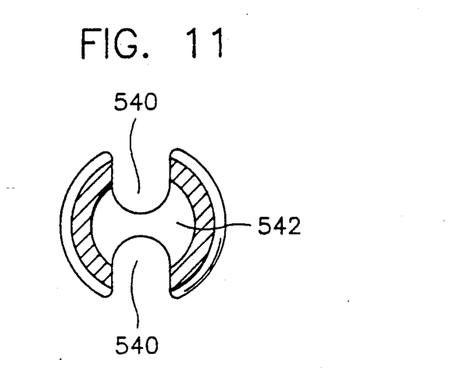
FIG. 11 is a cross-sectional view taken along line A—A of FIG. 8.
Figure 12:
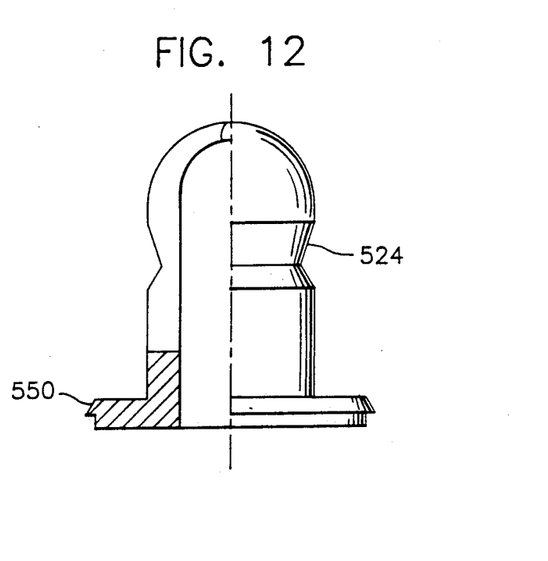
FIG. 12 is a partial sectional view of the central extension member shown in FIG. 8.

Member 506 includes two longitudinally extending grooves 540 extending along opposite sides of the member 506. The grooves 540 terminate at an upper end of the member in bridge span 542. The grooves 540 communicate a hollow interior portion 544 to the exterior of the member 506 through the grooves 540. Due to the grooves extending longitudinally in a vertical direction along the height of the member 506, portion 526 is compressed when passing through channel 520 and contacting rib 522. After passing beyond rib 522, portion 526 is released from compression and returns to its original configuration. However, at this point, rib 522 is located within groove 524 to allow relative locked rotation between adjacent segments 502.

Extension member 506 is secured in position by securing ring washer 512 having central opening 546 and locking projection 514. A radially outermost ridge 548 of washer 512, shown in detail in FIG. 15, engages in tapered edge 550 (shown in FIG. 8) of member 506. The diameter of washer 512 is equal to the inner diameter of the stepped portion 508 of segment 502 so as to be adhesively bonded within the stepped recess 508. When projection 514 is engaged in opening 516, the member 506 is locked in position at the end 504 of annular segment 502.

In an alternate embodiment of a central extension member, as shown in FIGS. 16 through 20, a central extension member 550 is shown having a bulb portion 552 and cylindrical portion 554. Base plate 556 is similar to base plate 510 of the member 506 and similarly includes a hole 558 for cooperating with a securing ring washer 512, as shown in FIGS. 13 through 15. The member 550 includes two longitudinally extending openings 560, which communicate with a central cavity 562 in a similar fashion as for member 506. A bridging portion 564 extends from an upper portion of separated halves 566 forming the extension member 550.

Figure 16:
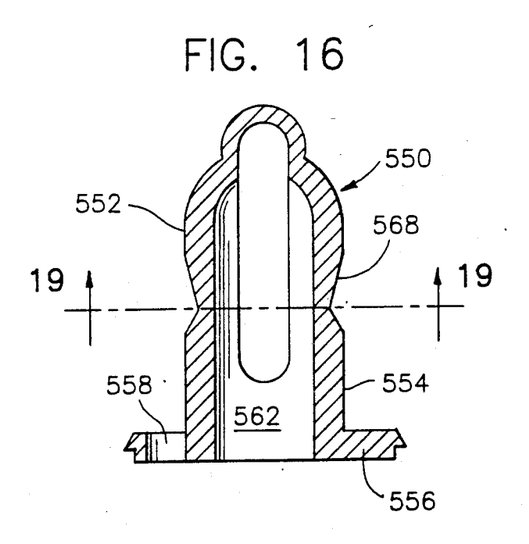
FIG. 16 is a sectional view of an alternate central extension member for mounting at an end of an annular segment.
Figures 17, 19:
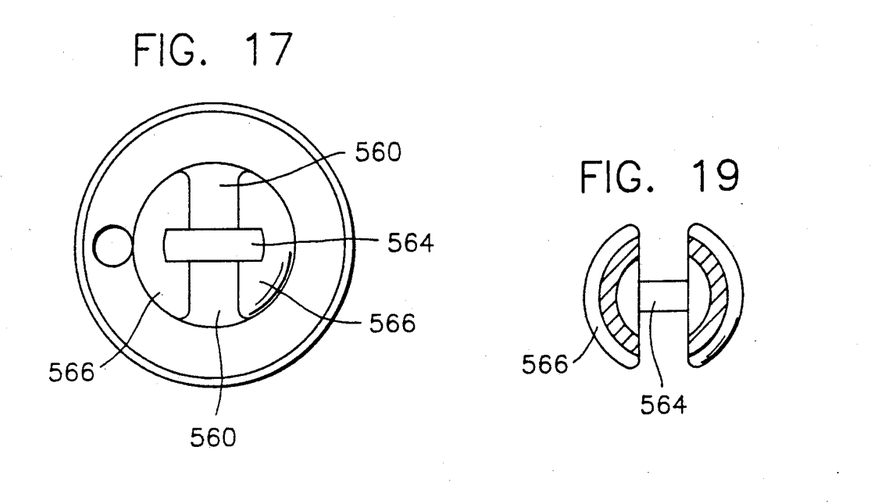
FIG. 17 is a top plan view of FIG. 16.
FIG. 19 is a cross-sectional view taken along line A—A of FIG. 16.
Figure 18:
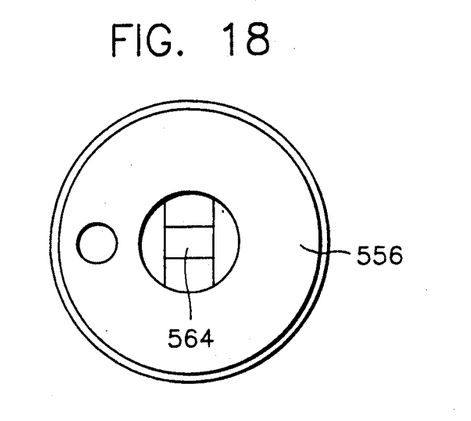
FIG. 18 is a bottom view of FIG. 16.
Figure 20:
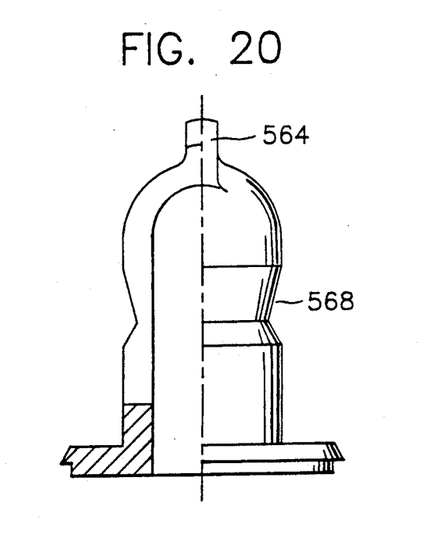
FIG. 20 is a partial sectional view of the central extension member shown in FIG. 16.
Figures 21, 23:
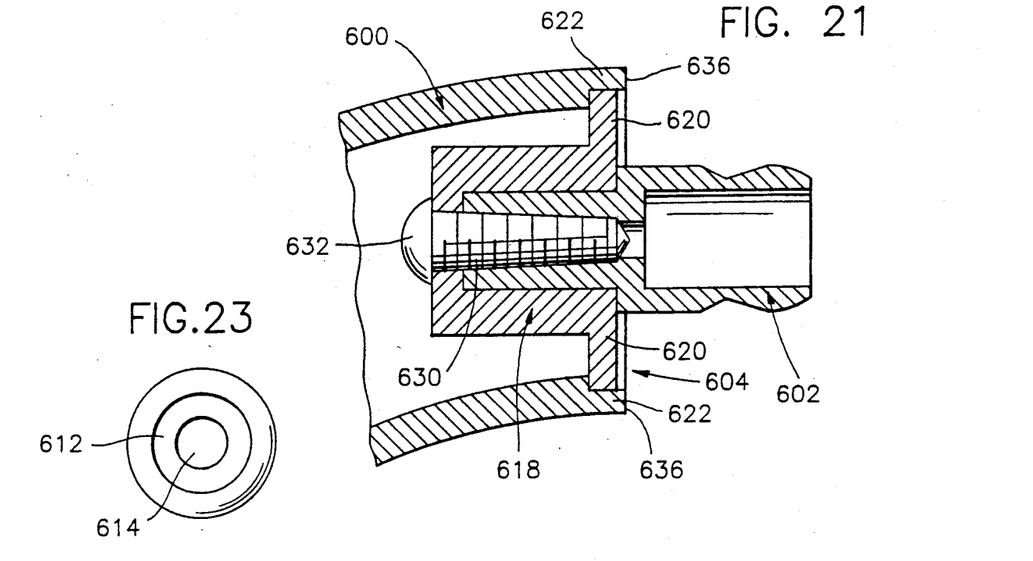
FIG. 21 is an alternate embodiment of a central extension member located at one end of an annular segment.
FIG. 23 is a top plan view of FIG. 22.
Figure 22:
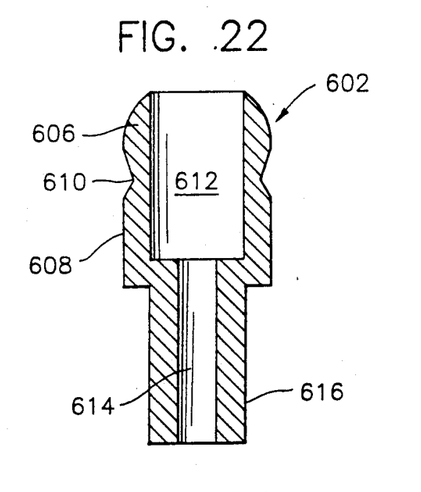
FIG. 22 is a sectional view of the central extension member of FIG. 21.
Figure 24:
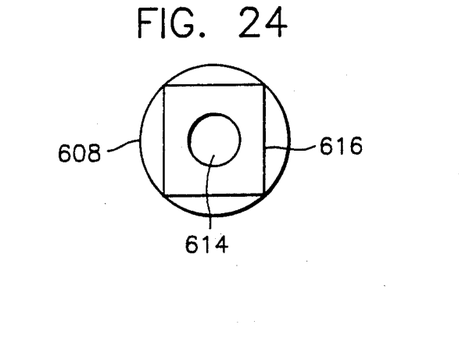
FIG. 24 is a bottom view of FIG. 22.
Figure 25:
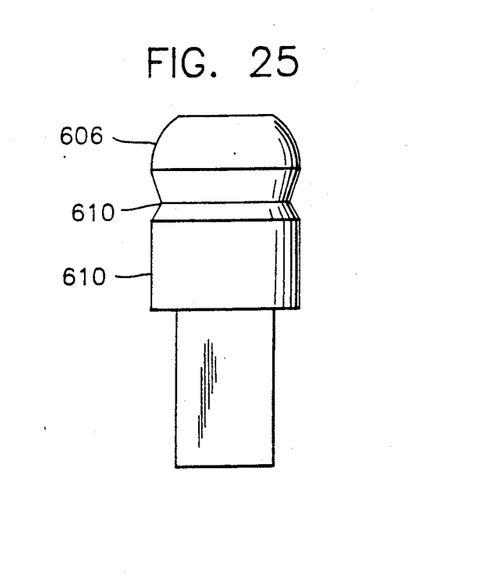
FIG. 25 is an elevation view of FIG. 22.

As with member 506, a recess 568 defined by a periphery of the member 550, separates the bulb portion 552 from the cylindrical portion 554 for compression of the bulb portion 552 as it passes by rib 522 of end 518 of annular segment 502. After passing rib 522 the bulb portion is biased to its normal shape with the rib 522 engaged in the recess 568 for rotatably interconnecting adjacent segments 502.

In FIGS. 21 through 28, an alternate embodiment is shown for an interconnection between an annular segment 600 and end 518 of an annular segment 502, as shown on the right side of FIG. 7. A central extension member 602 is mounted at one end 604 of the segment 602. The central extension member 602 is dimensioned to matingly engage and be retained within an end 518 of an annular segment 502 as is shown in FIG. 7.

In FIGS. 22 through 25, the central extension member is shown in detail having a bulb portion 606 and a cylindrical portion 608 separated by a recess 610, corresponding in shape to rib 522 of segment 502. Member 602 includes a hollow cavity 612 communicating with a screw shaft 614 extending centrally through the member 602. A lower portion 616 of the member 602 is square shaped for seating in a support member 618 as will be explained with reference to FIGS. 21 and 26 through 28.

Figure 26:
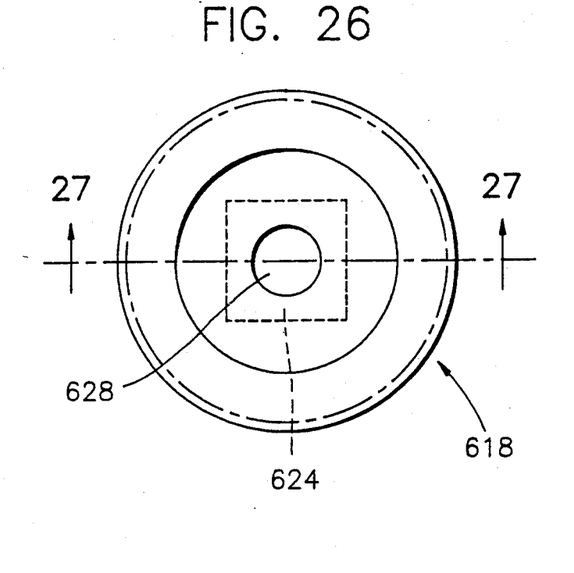
FIG. 26 is a bottom view of a central extension member holder.
Figure 27:
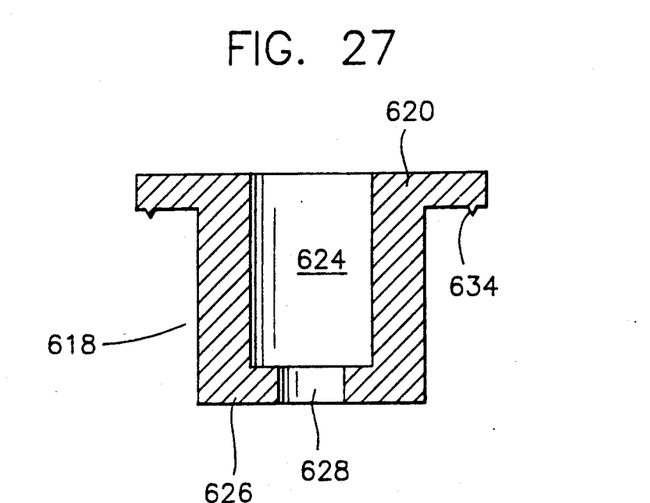
FIG. 27 is a cross-sectional view taken along line 27—27 of FIG. 26.
Figure 28:
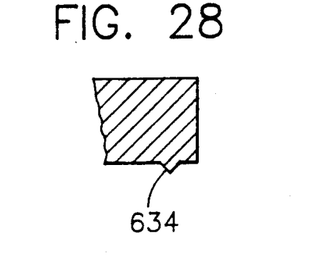
FIG. 28 is a enlarged view of detail A of FIG. 27.

The seat member 618 includes an annular flange 620 seated within stepped portion 622 of segment 600. The seat portion 618 includes a square cavity 624 for receipt of portion 616. Extending through the bottom 626 of seat portion 618 is an opening 628 for receipt of a screw shank 630 which passes through the opening 628 and is screwed into screw shaft 614 to secure the member 602 in the seat portion 618. A head 632, mounted at one end of the screw shank 630, is larger than opening 628 and is retained against the bottom 626 of the seat portion 618.

The annular flange 620 includes a downwardly extending projection 634 for engagement in the stepped portion 62 of annular segment 600 so as to secure the seat portion 618 and thereby the member 602 at end 604 of segment 600. The seat portion 618 is adhesively bonded within the end 604 of segment 600. Similar to the anchoring of the extension members 506 and 550 in end 518 of annular segment 502, the central extension member 602 has its bulb portion 606 compressed when entering channel 520 and contacting rib 522. The bulb portion 606 returns to its original, uncompressed condition after passage of rib 522 with rib 522 engaging and seating within recess 610. Adjacent segment 502 having rib 522 engages circumferential rim 636 for interengagement and rotation with respect to each other of adjacent segments.

Specific Embodiment

The following particulars are given as an illustrative example of one embodiment of the annular device. In this example, each segment is made of conventional plastic molded in a hollow, torus quadrant, body portion with separate end pieces. The torus quadrant has a radius of revolution (first generator) of 4.1 cm, and a circle radius (second generator) of 0.9 cm. The central extension is 1 cm long by 0.4 cm in diameter, with a bifurcated end. The central channel has a diameter slightly in excess of 0.9 cm with an inwardly tapered terminal portion so that the bifurcated end of the central extension will expand due to its natural bias after having been compressed to pass by a rib of the central channel to permit a snug but twistable fit. The dimensions and material given above are not intended as defining the limitations of the invention. Numerous other dimensions and configurations are possible.

Industrial Applicability

It will be apparent to those skilled in the art that the objects of this invention have been achieved by providing an annular device of pivotally connected segments which may be twisted into many useful configurations. The random orientations of the twist axis between segments prevent the device from collapsing downward. An individual segment cannot be twisted or moved independently, but must be displaced as a unit with a set of adjacent segments. This configuration retention property permits the annular device to withstand normal "bumps" and "jars" without configuration degradation. The annular device which may be twisted into an infinite number of decorative configurations because each twist axis has complete rotational freedom. This infinite variation, and the continuous, flowing appearance of the device have a mesmeric effect on the user. The annular device has a tranquilizer function.

Conclusion

Clearly various changes may be made in the structure and embodiments shown herein without departing from the concept of the invention. Further, the features and construction of the embodiments shown in the various Figures may be employed with the embodiments of the other Figures.

Therefore, the scope of the invention is to be determined by the terminology of the following claims and the legal equivalents thereof.

I claim:

1. A continuous device which may be twisted into an infinite variety of configurations, comprising:
   a plurality of serially connected rigid segments having a first end pivotally secured to one of two adjacent segments, and a second end pivotally secured to the other one of the two adjacent segments, permitting each segment to be twisted relative to the two adjacent segments causing the annular device to assume any one of an infinite number of configurations, each configuration having a continuous center line therearound;
   a first end face on the first end of each segment, which end face is normal to the center line of the annular device defining a first interface plane for each segment, the first end of each segment forming a first interface with the cooperating end of the one of the two adjacent segments along the first interface plane with a pivot axis therethrough normal to the first interface plane;
   a second end face on the second end of each segment, which end face is normal to the center line of the annular device defining a second interface plane for each segment, the second end of each segment forming a second interface with the cooperating end of the other one of the two adjacent segments along the first interface plane with a pivot axis therethrough normal to the first interface plane;
   a first engagement means on the first end face of each segment; and
   a second engagement means on the second end face of each segment for engaging the first engagement means on the other one of the two adjacent segments for securing the plurality of segments together;
   the first engagement means is a cylindrical central extension means extending from the first end face;
   the second engagement means is a cylindrical central channel means extending into the second end face for pivotally engaging the extension means on the other one of the two adjacent segments,
   the extension means has a recess separating a cylindrical portion and an at least partially divided bulb portion for engaging the channel means to pivotally secure the adjacent segments together, said at least partially divided bulb portion including two opposed grooves interconnected by a bridge portion at a terminal portion of said extension means;
   the channel means has a radially inwardly extending rib separating a cylindrical portion from a terminal portion of said channel means for engaging the recess on the extension means after compression of the bulb portion in said cylindrical portion of said channel means during insertion of the extension means into the channel means, said rib tapering radially inwardly from said cylindrical portion of said channel means to a radially innermost point and tapering radially outwardly from said radially innermost point to said terminal portion of said channel means;
   the center axis of the cylindrical extension means is coincident with the center axis of the cooperating cylindrical channel means on the one adjacent segment forming a common pivot axis;
   the continuous center line through the annular device is a line of radial symmetry around the annular device;
   the coincident center axes are also coincident with the center line of radial symmetry at the interface plane between adjacent segments.

2. The annular device of claim 1, wherein the extension means is bifurcated and separable from the channel means.

3. The annular device of claim 1, wherein the center axis of the cylindrical extension means is coincident with the center axis of the cooperating cylindrical channel means on the one adjacent segment forming a common pivot axis.

4. The annular device of claim 3, wherein the continuous center line through the annular device is a line of radial symmetry around the annular device.

5. The annular device of claim 4, wherein the coincident center axes are also coincident with the center line of radial symmetry at the interface plane between adjacent segments.

6. The annular device of claim 5, wherein all cross-sections through the end portions of the segments proximate either end face thereof which are normal to the center line of symmetry, are circular and identical.

7. The annular device of claim 5, wherein all cross-sections through any segment which are normal to the center line of symmetry, are circular and identical.

8. The annular device of claim 5, wherein each segment is identical.

9. The annular device of claim 1, wherein at least a portion of the segments are formed by a section of a torus of revolution.

10. The annular device of claim 9, wherein all of the segments are one quarter torus sections.

11. The annular device of claim 9, wherein all of the segments are one eighth torus sections.

* * * * *